United States Patent
Boek et al.

(10) Patent No.: US 6,418,261 B1
(45) Date of Patent: Jul. 9, 2002

(54) METHOD TO REDUCE WARPAGE AND POLARIZATION SENSITIVITY OF PLANAR DEVICES

(75) Inventors: Heather D. Boek, Corning; Patrick J. Cimo, Horseheads; Pushkar Tandon, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/624,306

(22) Filed: Jul. 24, 2000

(51) Int. Cl.$^7$ .................................................. G02B 6/10
(52) U.S. Cl. ...................................... 385/129; 385/131
(58) Field of Search ................................. 385/129–131

(56) References Cited

U.S. PATENT DOCUMENTS

| | | | | |
|---|---|---|---|---|
| 4,889,401 A | * | 12/1989 | Klement et al. | 385/129 |
| 5,800,860 A | * | 9/1998 | Kilian et al. | 427/163.2 |
| 5,930,439 A | * | 7/1999 | Ojha et al. | 385/129 |

FOREIGN PATENT DOCUMENTS

EP 0907090 A2 7/1999

OTHER PUBLICATIONS

S. Suzuki et al. (1997), "Polarization–insensitive arrayed–waveguide gratings using dopant–rich silica–based glass with thermal expansion adjusted to Si substrate", Electronic Letters, 33 (13), 1173–1174, Apr. 1977.
S.M. Ojha et al. (1998), "Simple method of fabricating polarization–insensitive and very low crosstalk AWG grating devices", Electronic Letters, 34 (1), 78–79 No month.

* cited by examiner

Primary Examiner—Ellen E. Kim
(74) Attorney, Agent, or Firm—Svetlana Short

(57) ABSTRACT

An optical device is provided including a substrate having an underclad layer, a core layer, and a pair of overclad layers deposited thereon. The substrate has a first coefficient of thermal expansion. The underclad layer has a first index of refraction. The first overclad layer has an index of refraction which is approximately equal to the first index of refraction. The second overclad layer has a coefficient of thermal expansion which is greater than the first coefficient of thermal expansion.

26 Claims, 1 Drawing Sheet

METHOD TO REDUCE WARPAGE AND POLARIZATION SENSITIVITY OF PLANAR DEVICES

BACKGROUND OF THE INVENTION

1. Technical Field

The present invention generally relates to planar optical devices and, more particularly, to a planar optical device having reduced warpage and reduced polarization sensitivity.

2. Discussion

Planar optical devices generally include a substrate having thin glass layers deposited thereon. A typical device includes a silicon substrate and three glass layers. The three layers are generally known as the underclad layer which is deposited on the substrate, the core layer which is deposited on the underclad layer and the overclad layer which is deposited on the core layer.

For most applications, the polarization sensitivity of planar optical devices needs to be as low as possible. Polarization sensitivity of planar devices formed on silicon substrates is largely dependent on stress, including the warpage of the finished device. Polarization sensitivity is the wavelength shift, measured in nm, caused by the stress induced Birefrigence or TE-TM shift. This stress arises because of the huge mismatch in the coefficient of thermal expansion between the substrate and the glass layers.

One method that has been suggested for reducing warpage and therefore polarization sensitivity is to use glasses having high coefficients of thermal expansion for the overclad layer. For example, an overclad layer having a coefficient of thermal expansion approximately equal to $37\times10^{-7}/C$ would be desirable on silicon substrates. Unfortunately, it is also desirable for the overclad layer to have an effective index of refraction which is approximately equal to the effective index of refraction of the underclad layer (1.457 for silicon, for example).

To date, no commercially available planar devices are known that have all glass overclad layers with such high coefficients of thermal expansion (e.g., $37\times10^{-7}$ /C) and an index of refraction which matches the index of refraction of the underclad layer. Further, no glass is known which is suitable for use as an overclad layer that has coefficient of thermal expansion greater than $27\times10^{-7}/C$ that also has an effective index of refraction approximately equal to that of the underclad layer.

While optical devices incorporating an overclad layer having a coefficient of thermal expansion of $27\times10^{-7}/C$ have yielded polarization sensitivities of 0.1 nm, this level of polarization sensitivity is unacceptable for future optical devices. This is particularly true for wavelength division multiplexers or other devices having a channel spacing less than 100 GHz.

SUMMARY OF THE INVENTION

In view of the foregoing, it would be desirable to provide a novel approach to achieving reduced stress, including warpage in planar optical devices to yield even lower polarization sensitivities.

The above and other objects are provided by an optical device including a substrate having a first coefficient of thermal expansion. An underclad layer with a first index of refraction is deposited on the substrate. A core layer is deposited on the underclad layer. The core layer has a second index of refraction which is greater than the first index of refraction. A first overclad layer is deposited on the core layer. The first overclad layer has a third index of refraction which is approximately equal to the first index of refraction. A second overclad layer is deposited on the first overclad layer. The second overclad layer has a second coefficient of thermal expansion which is greater than the first coefficient of thermal expansion.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a planar optical device having a low degree of stress, including warpage and reduced polarization sensitivity. According to an embodiment of the present invention, a pair of overclad layers are deposited on the core layer. The overclad layer adjacent the core layer has an effective index of refraction matching that of the underclad layer and a coefficient of thermal expansion which is as high as can be achieved while simultaneously satisfying the matching index of refraction constraint. The second overclad layer is deposited on the first overclad layer and includes a coefficient of thermal expansion greater than that of the substrate. The positive coefficient of thermal expansion mismatch between the second overclad layer and the substrate compensates for the negative coefficient of thermal expansion mismatch between the underclad, core and first overclad layers with respect to the substrate.

Figure 1:
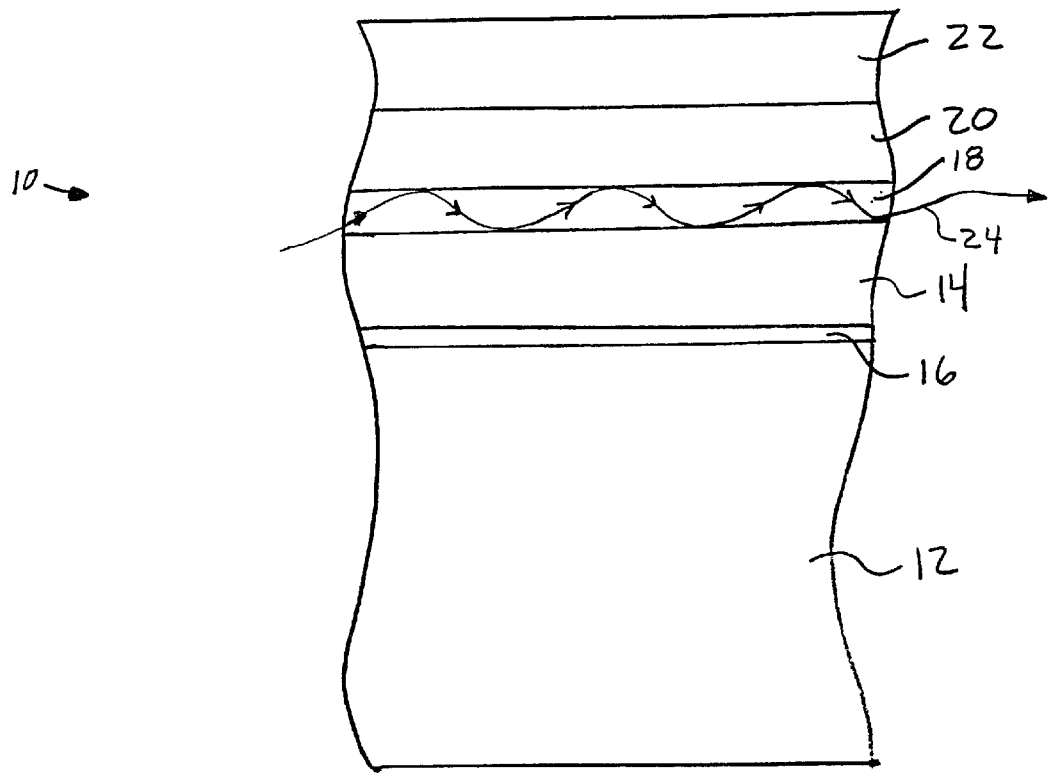
FIG. 1 is a side elevational view of an optical device incorporating the teachings of the present invention.

Referring now to the drawing figure, FIG. 1 illustrates an optical device 10 according to the embodiments of the present invention. The optical device 10 includes a substrate 12 having an underclad layer 14 deposited thereon. This substrate 12 may be silicon or silicon glass, for example. An optional silicon or silicon glass layer 16, for example a PECVD or a thermal oxide layer, is interposed between the substrate 12 and the underclad layer 14. This layer 16 is typically ½ to 4 µm thick. However, a single underclad layer 14 of thick enough (i.e., greater than 13 µm) which is a PECVD or thermal oxide silicon layer may be sufficient and the additional underclad layer 14 may not be needed.

A core layer 18 is deposited on the underclad layer 14. A first overclad layer 20 is deposited on the etched core layer 18. A second overclad layer 22 is deposited on the first overclad layer 20. Preferably, the underclad layer 14, core layer 18, first overclad layer 20, and second overclad layer 22 are deposited by way of a flame hydrolysis deposition process.

The substrate 12 is preferably formed of silicon and has a preselected coefficient of thermal expansion. For example, the coefficient of thermal expansion of the substrate 12 may be approximately equal to $37\times10^{-7}/C$.

The underclad layer 14 is preferably formed of a glass which is doped with a dopant such as $SiO_2$, $GeO_2$, $P_2O_5$, and $B_2O_3$. The underclad layer 14 has a coefficient of thermal expansion which is less than or equal to the coefficient of thermal expansion of the substrate 12. For example, the underclad layer may have a coefficient of thermal expansion approximately equal to $14 \times 10^{-7}/C$.

The underclad layer 14 also has a preselected effective index of refraction. For example, the index of refraction of the underclad layer 14 may be set equal to that of silica, or 1.4442 at a wavelength of 1550 nm. Medium indexes such as 1.5 or high indexes such as 1.7 may also be used if desired. The thickness of the underclad layer 14 is preferably selected to correspond with the index of refraction of the core layer 18 so as to prevent light leakage. Thicker underclad layers 18 are required as the difference between the indexes (i.e., percent delta) becomes lower. In one embodiment of the present invention, the underclad layer 14 has a thickness of about 15 micrometers. A typical thickness range for the underclad layer 14 is about 13 to about 20 $\mu$m.

The core layer 18 is preferably formed of a glass which is doped with a dopant such as $SiO_2$, $GeO_2$, $P_2O_5$, and $B_{23}$. The core layer 18 has a coefficient of thermal expansion which is less than or equal to the coefficient of thermal expansion of the substrate 12. For example, the core layer 18 may have a coefficient of thermal expansion approximately equal to $22 \times 10^{-7}/C$.

The core layer 18 also has an effective index of refraction which is greater than the index of refraction of the underclad layer 14. For example, the core layer 18 may have an effective index of refraction which is within about 0.34% to about 1.5% of the index of refraction of the underclad layer 14 at. The core layer 18 has a thickness which is selected to correspond to that of the underclad layer 14 in order to keep the light 24 in the core layer 18 and to prevent light leakage out of the core layer 18 into adjacent layers due to the difference in indexes of refraction of the core layer 18 and the underclad layer 14. Layers 14 and 20 are thicker than the core layer 18 and preferably about two or more times thicker than core layer 18. The typical thickness of layers 14 and 20 is between about 5 and about 8 $\mu$m. For example, in this embodiment, the core layer 18 has a thickness of about 6.6 $\mu$m.

The first overclad layer 20 is preferably formed of a $SiO_2$ glass doped with a dopant such as $GeO_2$, $P_2O_5$, and $B_2O_3$. Preferably, the first overclad layer 20 has an effective index of refraction which is less than the index of refraction of the core layer 18. Even more preferably, the first overclad layer 20 has an effective index of refraction which is approximately equal to the index of refraction of the underclad layer 14. For example, in this embodiment, the first overclad layer has an effective index of refraction equal to that of silica, or 1.4442 at a wavelength of 1550 nm. In other embodiments it may be different, depending on the index of refraction of the underclad layer that is being utilized.

The first overclad layer 20 also has a coefficient of thermal expansion which is as great as possible while still having its effective index of refraction approximately equal to the effective index of refraction of the underclad layer 14. For example, the coefficient of thermal expansion of the first overclad layer 20 may be approximately equal to $27 \times 10^{-7}/C$. Further, the first overclad layer 20 has a thickness which is as thin as possible without affecting a desired optical performance of the optical device 10. For example, the first overclad layer 20 may have a thickness of about 13 $\mu$m to about 20 $\mu$m. A thicker overclad layer will also work.

The second overclad layer 22 is preferably formed of a $SiO_2$ glass which is doped with dopants such as $GeO_2$, $P_2O_5$, and $B_2O_3$. Other kinds of optical materials may also be utilized. These materials may be, for example, silicon oxynitride; $TiO_2$, $Ta_2O_3$ doped glasses or some polymers. The second overclad layer 22 preferably has a coefficient of thermal expansion which is equal to or preferably greater than the coefficient of thermal expansion of the substrate 12. For example, the second overclad layer 22 may have a coefficient of thermal expansion of greater than $37 \times 10^{-7}/C$. The second overclad layer 22 preferably has a thickness which corresponds to a desirable level of warpage of the planar optical device 10. For example, in this embodiment, the second overclad layer has a thickness of about 24.6 $\mu$m.

Figure 2:
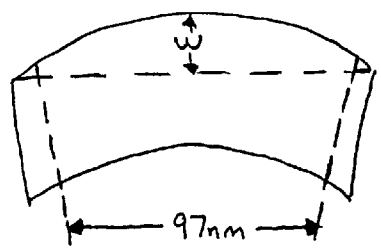
FIG. 2 is a schematic cross sectional view depicting the warpage of a planar device.

The above described embodiment optical device was prepared and tested for its warpage as follows and is illustrated in FIG. 2:

| Optical Layer | Thickness (micrometers) | Coef. of Thermal Expansion $\times 10^{-7}/C$ | Cumulative Warpage (w) measured after each subsequent layer (micrometers over 97 mm diameter substrate) |
|---|---|---|---|
| After underclad layer | 15 | 14 | 98.3 |
| After core layer | 6.6 | 22.6 | 161 |
| After first overclad layer of 20.1 micrometers | 20.1 | 27 | 167 |
| After first overclad layer of 39.4 micrometers | 39.4 | 27 | 180 |
| After second overclad layer | 24.6 | Greater than 37 | 117 |

Thus, an optical device is provided having two overclad layers for reducing stress, warpage and polarization sensitivity. The first overclad layer has a coefficient of thermal expansion as high as can be achieved while satisfying the constraint of having its effective index matching that of the underclad layer. The second overclad layer has a coefficient of thermal expansion greater than that of the substrate so as to compensate for the thermal expansion mismatch between the other glass layers and the substrate.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A planar optical device comprising:

a substrate having a first coefficient of thermal expansion;

an underclad layer on said substrate, said underclad layer having a first index of refraction;

a core layer on said underclad layer, said core layer having a second index of refraction which is greater than said first index of refraction;

a first overclad layer on said core layer, said first overclad layer having a third index of refraction which is less than said second index of refraction; and a second overclad layer on said first overclad layer, said second overclad layer having a second coefficient of thermal expansion which is greater than or equal to said first coefficient of thermal expansion, such that polarization sensitivity is less than 0.1.

2. A planar optical device according to claim 1 wherein said substrate is silicon.

3. The planar optical device of claim 1 wherein said third index of refraction is approximately equal to said first index of refraction.

4. The planar optical device of claim 3 wherein said first overclad layer has a third coefficient of thermal expansion greater than $22.6 \times 10^{-7}/°$ C. while maintaining said third index of refraction approximately equal to said first index of refraction.

5. The optical device of claim 1 wherein said underclad layer has a fourth coefficient of thermal expansion which is less than or equal to said first coefficient of thermal expansion.

6. The optical device of claim 1 wherein said core layer has a fifth coefficient of thermal expansion which is less than or equal to said first coefficient of thermal expansion.

7. The planar optical device of claim 1 further comprising a thermal layer interposed between said substrate and said underclad layer, wherein said thermal layer comprises silicon, silicon glass or silicon oxide.

8. The planar optical device of claim 1 wherein said underclad, core, first overclad, and second overclad layers are deposited with flame hydrolysis deposition.

9. An optical device having reduced polarization sensitivity comprising:
   a substrate having a first coefficient of thermal expansion;
   an underclad layer deposited on said substrate, said underclad layer having a first index of refraction;
   a core layer deposited on said underclad layer, said core layer having a second index of refraction;
   a first overclad layer deposited on said core layer, said first overclad layer having a third index of refraction which is approximately equal to said first index of refraction; and
   a second overclad layer deposited on said first overclad layer, said second overclad layer having a second coefficient of thermal expansion which is greater than or equal to said first coefficient of thermal expansion, expansion, such that polarization sensitivity is less than 0.1.

10. The optical device of claim 9 wherein said first overclad layer has a third coefficient of thermal expansion greater than $22.6 \times 10^{-7}/°$ C. while maintaining said third index of refraction approximately equal to said first index of refraction.

11. The optical device of claim 10 wherein said substrate further comprises silicon.

12. The optical device of claim 10 wherein said underclad layer has a fourth coefficient of thermal expansion which is less than said first coefficient of thermal expansion.

13. The optical device of claim 12 wherein said fourth coefficient of thermal expansion is approximately equal to $14 \times 10^{-7}/C$.

14. The optical device of claim 10 wherein said core layer has a fifth coefficient of thermal expansion which is less than said first coefficient of thermal expansion.

15. The optical device of claim 14 wherein said fifth coefficient of thermal expansion is approximately equal to $22 \times 10^{-7}/C$.

16. The planar optical device of claim 9 further comprising a thermal layer interposed between said substrate and said underclad layer, wherein said thermal layer comprises silicon, silicon glass or silicon oxide.

17. The planar optical device of claim 9 wherein said underclad, core, first overclad, and second overclad layers further comprise glass doped with at least one dopant selected from a group including $GeO_2$, $P_2O_5$, and $B_2O_3$.

18. The optical device of claim 11 wherein said first coefficient of thermal expansion is approximately equal to $37 \times 10^{-7}/C$.

19. The optical device of claim 18 wherein said third coefficient of thermal expansion is approximately equal to $27 \times 10^{-7}/C$.

20. A method of producing an optical device with reduced warpage comprising:
   providing a substrate with a first coefficient of thermal expansion;
   depositing an underclad layer on said substrate, said underclad layer having a first index of refraction;
   depositing a core layer on said underclad layer, said core layer having a second index of refraction;
   depositing a first overclad layer on said core layer, said first overclad layer having a third index of refraction which is approximately equal to said first index of refraction; and
   depositing a second overclad layer on said first overclad layer, said second overclad layer having a second coefficient of thermal expansion which is greater than or equal to said first coefficient of thermal expansion, wherein said first overclad layer has a third coefficient of thermal expansion which is as great as possible while maintaining said third index of refraction approximately equal to said first index of refraction.

21. The method of claim 20 wherein said underclad layer has a fourth coefficient of thermal expansion which is less than or equal to said first coefficient of thermal expansion.

22. The method of claim 20 wherein said core layer has a fifth coefficient of thermal expansion which is less than or equal to said first coefficient of thermal expansion.

23. The method of claim 20 further comprising forming a thermal layer between said substrate and said underclad layer, wherein said thermal layer comprises silicon, silicon glass or silicon oxide.

24. The method of claim 20 wherein said underclad, core, first overclad, and second overclad layers are deposited with flame hydrolysis deposition.

25. The method of claim 20 wherein said substrate further comprises silicon.

26. The method of claim 20 wherein said underclad, core, first overclad, and second overclad layers further comprise glass doped with at least one dopant selected from a group including $GeO_2$, $P_2O_5$, and $B_2O_3$.

* * * * *